Patented Jan. 17, 1939

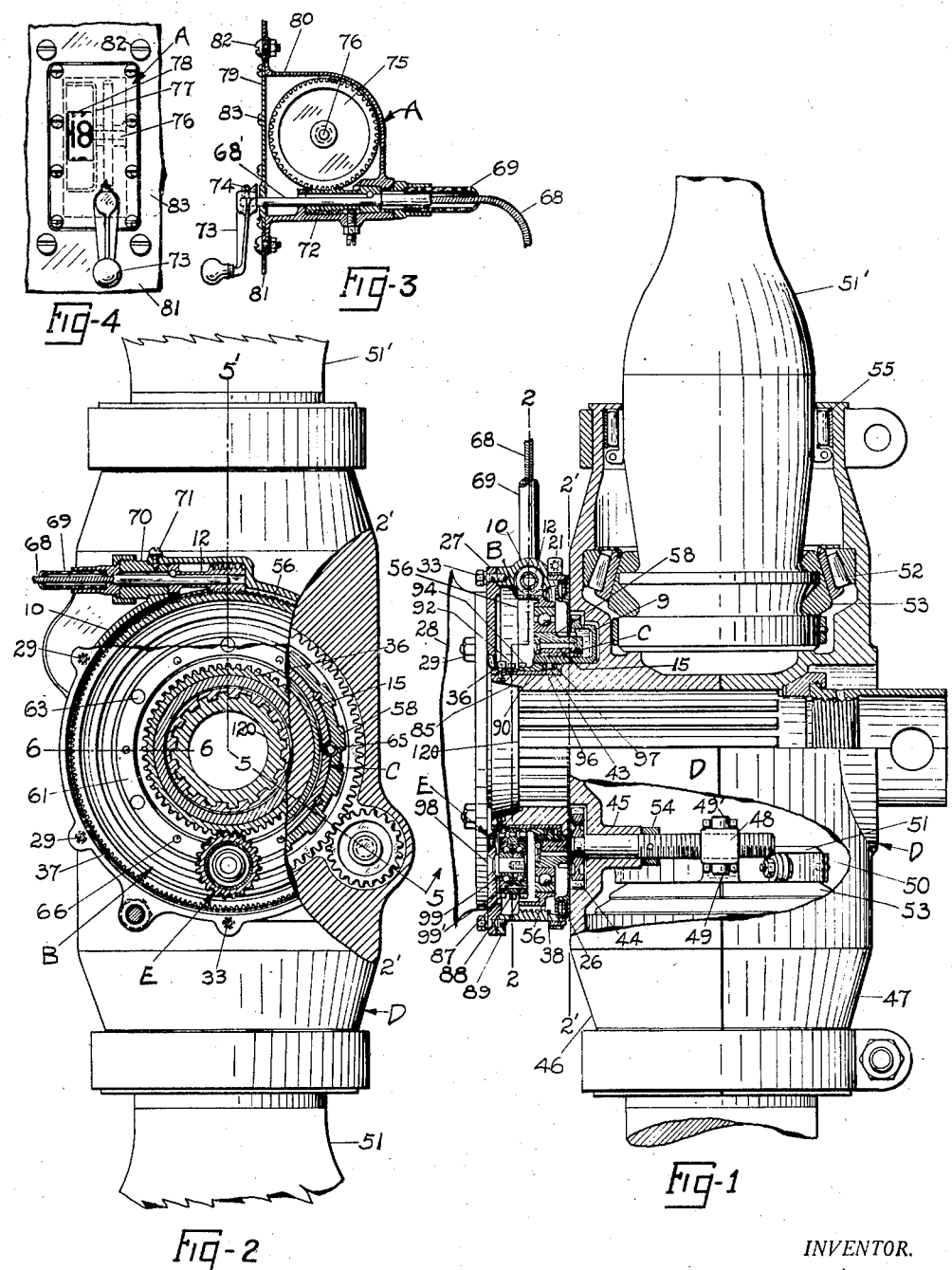

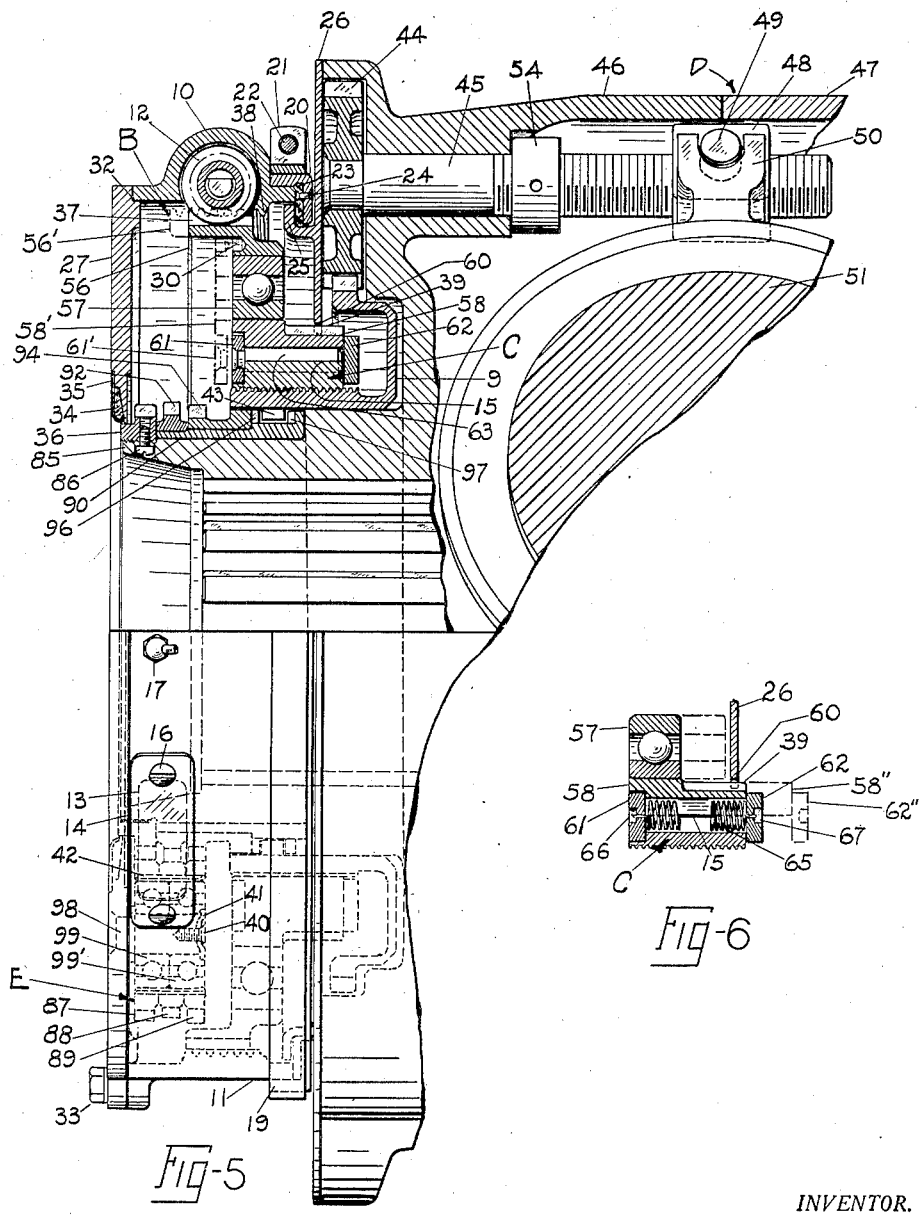

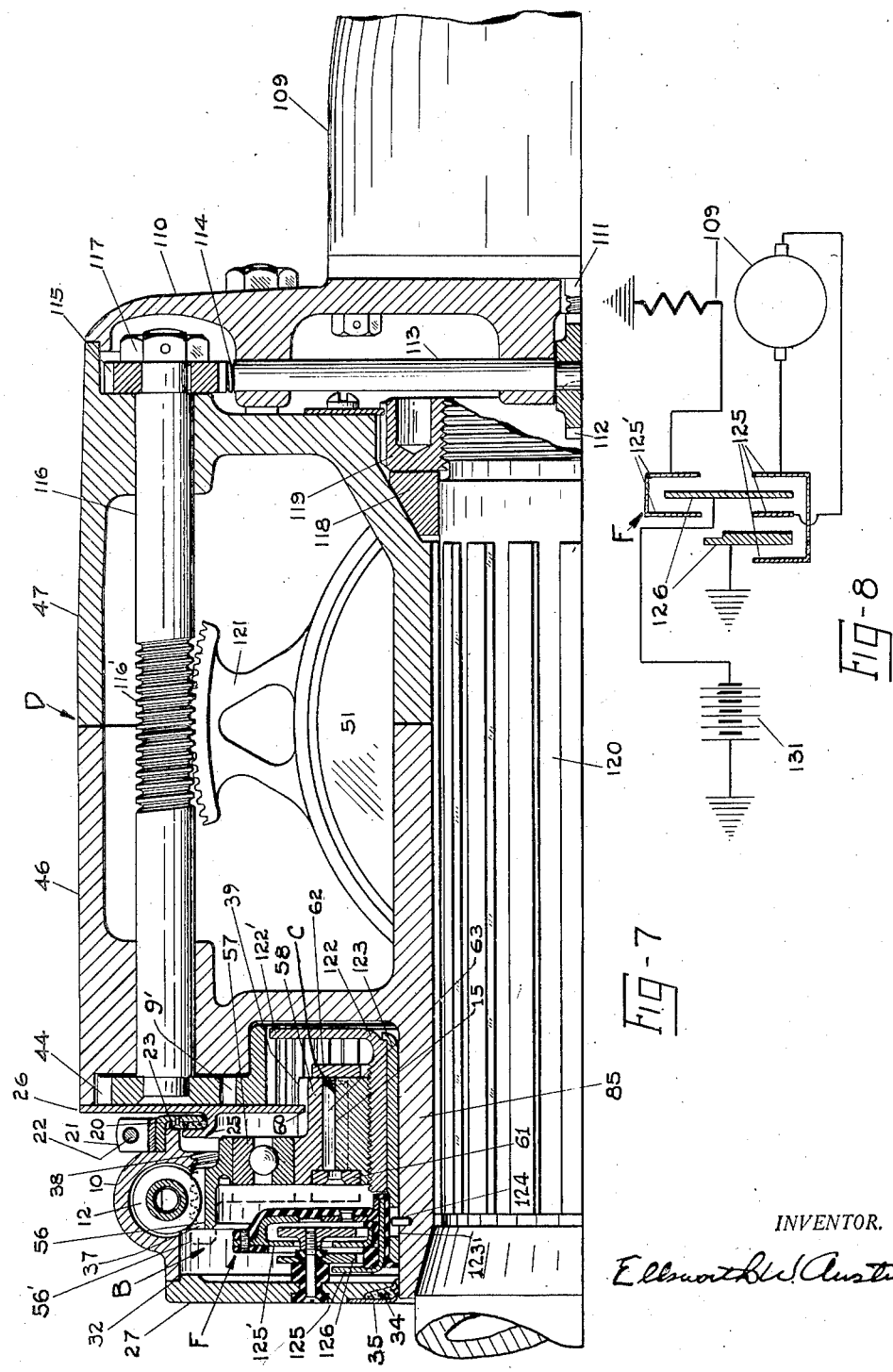

2,144,007

UNITED STATES PATENT OFFICE 2,144,007

PROPELLER CONTROL MECHANISM

Ellsworth W. Austin, Oakland, Calif., assignor to Bendix Products Corporation, South Bend, Ind., a corporation of Indiana Application May 3, 1932, Serial No. 608,885

8 Claims. (Cl. 170—163)

This invention relates to propeller control mechanisms generally, and more particularly to that type of propeller control mechanism to operate with an aircraft variable pitch propeller.

The objects of the invention generally are to provide a device having mechanical means for controlling the blade adjusting mechanism of a variable pitch propeller, to obtain maximum efficiency thereof, under varying conditions of take-off and flight.

It is therefore a particular object of the invention to provide a pitch setting mechanism so arranged with respect to the revolving blade adjusting mechanism, to permit the establishment, from a remote control station, of any desired adjusting position for governing the extent of power engagement to actuate the blades in respect to pitch.

A further object of the invention is to provide a means for automatically disengaging the power connections to the blades, upon completion of the adjustment, thus to insure an exactness involving the least possible error and to eliminate the danger of jamming at extreme blade positions.

Further objects are to produce a device well adapted to production methods of manufacture and to be compact, light in weight, simple in construction and durable in use.

The foregoing objects are attained in one form of propeller control mechanism embodying this invention, which is illustrated in the accompanying drawings, wherein:—

Fig. 1 is a view, partly in side elevation and partly in vertical section, of an aircraft variable pitch propeller embodying my invention.

Fig. 2 is a transverse sectional view of the control mechanism taken on lines 2—2 and 2'—2' of Fig. 1, the propeller being shown in rear elevation.

Fig. 3 is a sectional view of the control station.

Fig. 4 is a front elevational view of the control station.

Fig. 5 is an enlarged view, partly in side elevation and partly in vertical section, as along line 5—5 of Fig. 2, this line being rotated in the direction of the arrow, to coincide with line 5—5'.

Fig. 6 is a sectional detail, on an enlarged scale of a portion of the pitch setting mechanism, as along line 6—6 of Fig. 2.

Fig. 7 is a vertical sectional view of the invention applied to an aircraft variable pitch propeller of another type, employing motor driven adjusting means; the upper half only being shown.

Fig. 8 is a diagrammatic view indicating the control circuits of the variable pitch propeller of Fig. 7.

With particular reference to the drawings wherein similar reference characters designate similar parts throughout the several views, A designates in general a control station connected to B which designates in general a pitch setting mechanism operating in conjunction with C which designates an aligning member. D designates a variable pitch propeller and E designates in general a gear system and F designates in general a combined reversing switch and slip-ring device.

The pitch setting mechanism B as shown in Figs. 1, 2, 5, and 7 is of novel construction and is positioned rearwardly of and adjacent to a variable pitch propeller D and a principal member of the pitch setting mechanism B is the housing 10 disposed in general to form a cylindrical shell suitably pieced to receive the worm 12 and as illustrated in Fig. 5, the oblong opening 13 is provided for inspection purposes with the cover 14 normally secured in place by the screws 16, and 17 is a conventional type of fitting for lubrication. Secured about the annular surface 11 are half collars 19 and 20 extending inwardly to support packing 23 riveted thereto at 24 and clamp collar 21 is provided with bolt 22 for securing the half collars firmly in place. Oil slinging ring 25 is joined as an integral part to the plate 26, thus providing an effective oil seal between the fixed housing 10 and the propeller D; especially necessary when the latter is rotating at its normally high speed, in service. Housing plate 27 is secured to housing 10 by the screws 33, and is disposed concentrically in relation to the housing to function as a rear cover, and a conventional lip 32 is provided at the intersection thereof, and any convenient method such as bolts 29, may be employed to secure the pitch setting mechanism B firmly to an engine case 28. 34 denotes an annular packing secured to the housing plate 27 by the ring 35 which is welded in place, thus to effect an annular seal in conjunction with the rotating propeller.

Another principal member of the pitch setting mechanism B, is the adjustable non-rotating primary ring member 56 which has a composite exterior, accordingly arranged with worm gear teeth 37, the tips thereof threaded to engage internal threads 38 of housing 10. Spanner wrench holes are provided at 30 to facilitate assembly, and forcibly fitted within the ring member 56 is an anti-friction radial-thrust bearing 57 of usual form which is in turn forcibly fitted over the periphery of the novel rotating secondary setting member 58 which has external grooves 59 for slidable engagement of inwardly extending fingers 60 of the plate 26, as shown in Figs. 5, 6 and 7.

The aligning member C is provided as a further novel member and has a smooth surface as at 15 upon which the setting member 58 may slide axially when set-over adjustment of the same is made, and plate members 61 and 62 are arranged, one on either side to firmly seat upon end surfaces of both the setting member 58 and the aligning member C, and pins 63 are firmly riveted to one or the other of the plate members to extend inwardly from either side, in alternate sequence, to function as key members within the suitably registered half holes provided by the setting member and aligning member. Referring more especially to Fig. 6, extension springs 65 are assembled with initial loading and secured at their extremities within eyes 66 and 67 of plate members 61 and 62 respectively, thus to assure positive seating of the plate members for normal radial alignment of the aforementioned members therebetween.

It will be noted in Fig. 5 that the aligning member C is internally threaded for the reception of suitable threads of ring gear 9, thus establishing a direct relation between the amount of axial travel of the aligning member and the amount of rotation of the ring gear, and at all times providing a working connection for thrust forces in either direction axial of the threads.

In service the worm 12 is rotated through the medium of flexible shaft 68 within the casing 69 which is secured by the threaded coupling 70 to the control housing 10 and locked with screw 71. In Fig. 3 is shown flexible shaft 68 connected with control station A of which indicator worm 72 is coupled as by shaft extension 68' to the handle 73 which is located conveniently for the operator and secured in place by a set screw 74. Indicator worm 72 is meshed with worm wheel 75 mounted on shaft 76 and firmly united to dial 77, a portion of the face of the latter being visible to the operator, through the glass opening 78 arranged in cover 79 of the casing 80 which forms a substantial housing for the worm, worm wheel and dial members; the casing being supplied with suitable bolts 82 for mounting to the aircraft instrument panel 81. Machine screws 82 are utilized for securing cover 79 in place.

In the form of application shown in Figs. 1, 2 and 5, power for blade adjusting action is supplied by the gear system E. Driving gear 36 which is secured to the threaded portion of hub 85 and locked in place by screw 86, is constantly meshed with an idler gear 87, and 88 and 89 are idler gears assembled together with the first mentioned idler gear 87 as by bushing 42 which provides a means for mounting the idler gears as a unit on the anti-friction bearings 99 and 99' which are secured to stub shaft 98 by the screw 40 in conjunction with washer 41, as best shown in Fig. 5; the stub shaft being firmly riveted to the housing plate 27. The idler gears are each of a different tooth value and as preferred idler gear 88 is slightly less in diameter than idler gear 87, and idler gear 89 is slightly greater in diameter than idler gear 87. It will be observed that gear 92 is constantly in mesh with idler gear 88, and is solidly welded to the sleeve type inner clutch member 90 which provides clutch teeth 97 positioned for service with the clutch teeth 43 of ring gear 9. Likewise the gear teeth cut in the periphery of outer clutch member 94 are constantly in mesh with the gear teeth of idler gear 89 and clutch teeth 96 are positioned oppositely to the aforementioned clutch teeth 97; the clutch teeth 43 of the ring gear being suitably disposed therebetween.

The method of operating the propeller control mechanism when applied to a variable pitch propeller with gear driven blade adjusting means is as follows:

The operator turns the adjusting handle 73 of control station A and, through the medium of indicator worm 72 and worm wheel 75, sufficient rotation in one direction brings to view a dial reading at the glass opening 78 for the desired adjustment of the propeller blades, and simultaneously through the medium of the flexible shaft 68 leading to the pitch setting mechanism B, worm 12 is rotated. Thus the engaging ring member 56 is turned and being arranged with the tips of the worm gear teeth 37 engaging the threads 38 of housing 10, axial set-over in a predetermined direction to a new position for the ring member 56, setting member 58 and plate member 61 is accomplished. The amount of the axial set-over being proportional to the amount of turning of the adjusting handle 73 in the one direction mentioned. Referring to Fig. 5, 56' illustrates the new position taken by the ring member 56 and likewise 58' and 61' illustrate the new positions taken by the setting member 58 and plate member 61, respectively. Aligning member C being threaded to the ring member 9 is not permitted to assume an axial set-over to the extent of the aforementioned members. However, due to force of springs 65, one of which is illustrated in Fig. 6, a pull is exerted on the aligning member in the direction of the set-over and clutch teeth 43 of the ring gear 9 are engaged, in this instance, with clutch teeth 96 of clutch member 94.

The gear train for transmitting power to clutch member 94 includes driving gear 36, idler gears 87 and 89 and produces a preferred rotation of clutch member 94 in the same direction as that sustained by the propeller hub which is being driven by engine shaft 120 and in excess of the speed thereof, the speed difference being relatively small; whereupon the ring gear 9, now being driven, imparts rotation to the gear 84, thus to turn the adjusting screw 45 solidly fixed thereto and which is journaled within the rear hub half 46. Collar 54 is provided as a thrust resisting means. Adjusting nut 48 is arranged for travel along the adjusting screw and has trunnions at 49 and 49' for engaging suitable ear portions of the adjusting arm 50 which is clamped in a conventional manner to the inner end of the propeller blade 51 which is thus rotated to increase, say, the angle of incidence thereof. It will be understood that in like manner the propeller blade 51' may be arranged for adjustment of its angle of incidence, both blades being adjusted simultaneously as from the above mentioned ring gear 9, and further, each blade is provided with anti-friction bearings, one of which is designated by 52 in Fig. 1, and is of the conventional tapered roller type, and the annular half ring members 53 are provided to inwardly engage the conventional grooves and buttresses of the propeller blade and thus the forces of centrifugal action are conveyed from the propeller blade to the half hub members 46 and 47, and radial anti-friction bearings are positioned at 55 to insure ease of operation in adjusting the propeller blade.

With further reference to Fig. 5 it will be seen that during the adjusting as above described, contemporaneous action is accomplished in that aligning member C is moved along the threads of ring gear 9 in an exact proportion to the amount of rotation of the ring gear and hence in exact proportion to the adjustment imparted to the propeller blades, and during the period of misalignment of the aligning member C with setting member 58, adjusting action for the propeller blades continues, as described. However, in due course the threading action of aligning member C by its connection with ring gear 9, brings the aligning member to again align with the setting member 58 in its new position, and thus the plate member 62 is brought to bear upon a seating surface of setting member 58, thereby to remove the application of the springs 65 for clutch engagement and with a slight overrun of the threading action a crowding of the clutch teeth to the neutral position illustrated in the drawings, is effected.

To further illustrate the method of operating the propeller control mechanism applied as above to a variable pitch propeller with gear driven to a blade adjusting means, and particularly to point out further utility of the device, a selection is made at the control station A, of a dial reading to represent a blade adjustment, requiring in this instance, a rotation of handle 73 in the direction opposite to the one direction in the instance previously described. Simultaneously as before but in a direction opposite the one direction of the first instance, the ring member 56 is turned, and hence by its engagement at the threads 38 of housing 10, set-over to a new position is accomplished opposite in axial direction to the position illustrated by the dotted lines of Fig. 5, and setting member 58 with plate member 62 take a position as illustrated by the dotted lines of Fig. 6 and denoted by 58" and 62" respectively.

It will be understood that with springs 65 acting to exert pressure of plate member 61 upon the aligning member C, ring gear 9, in this instance, engages with clutch member 90 and thus by means of the gear train including driving gear 36, idler gears 87 and 88 which produce a rotation of the clutch member 90 in the same direction as that sustained by the propeller hub, as previously described, but in this instance, at a speed slightly less than the speed of the propeller as a whole and with a speed difference preferably greater than the speed difference for producing rotation in the previously described instance, and therefore the ring gear 9 rotates in a reverse direction to that of the previously described instance and at a faster rate. Hence gear 44 turns the adjusting screw 45 in a reverse direction to produce a propeller blade rotation, in the same manner as before but in the opposite drection or to decrease the angle of incidence and at an appreciably faster rate, which is of value in quickly relieving the engine load as produced by the propeller, when such is desired under extreme operating conditions. Furthermore during the adjustment, a contemporaneous action is again accomplished in that aligning member C is moved along the threads of ring gear 9 in an exact proportion to the amount of rotation of the ring gear, but in this instance, reverse in direction from that previously made use of, and in exact proportion to the adjustment imparted to the propeller blades, as aforementioned, and aligning peller C is again brought to align with the setting memebr 58 to reestablish equilibrium in respect to the application of the spring 65 on the aligning member C and adjusting action is definitely stopped after the necessary slight overrun for disengagement of the clutch teeth 43.

In the form of application of the propeller control mechanism shown in Fig. 7, power for blade adjusting action is supplied by another method, the gear system and parts of the blade adjusting mechanism for the purpose being dispensed with. This method consists of the use of a reversible electric motor 109 disposed concentrically in respect to the axis of the propeller D and mounted to the fore part thereof to form, in effect, a nose for the propeller, and the plate 110 to which the motor is secured, is in turn bolted firmly to the front half hub member 47. Any suitable reduction gear system may be made use of to be disposed between the motor 109 and the variable pitch propeller blade 51, but in the particular embodiment of Fig. 7, a worm 111 is provided on the motor shaft, which engages worm wheel 112 mounted to one end of shaft 113 which is suitably journaled within the plate 110 and which provides worm 114 to engage worm wheel 115 keyed to the blade adjusting worm shaft 116 and further secured to the shaft by nut 117.

The propeller hub members 46 and 47 are held together substantially in a usual manner and mounted on the engine shaft 120 with wedge ring 118 and nut 119 functioning in conventional manner to secure the propeller D on the shaft.

Engaging the worm 116' is a gear segment 121 secured to the inner end of the propeller blade 51, and the spur gear 44 is mounted on the rearward end of worm shaft 116 to engage ring gear 9' which in this instance, is provided with internal splines for the slidable reception of co-functioning projections as at 122' of the driving member 122 which is threaded externally and journaled upon the inner sleeve member 123, the latter being arranged to slide appreciably along the hub portion 85 of the rear half hub member 46, and driving pin 124 projects from the hub portion 85 sufficiently to engage a slot 123' disposed longitudinally of the inner sleeve member.

The slip-ring members 125 and 125' of the combined reversing switch and slip-ring device F are suitably insulated and solidly mounted upon the rearward portion of the inner sleeve member 123 to travel axially therewith and the co-functioning brush members 126 are firmly secured in conventional manner to the housing plate 27 and are disposed interjacent to the contact surfaces of the slip-ring members.

To adjust the propeller blades in respect to their pitch angles, the operator may set the indicator of the control station A to any desired pitch angle reading to increase or decrease the pitch as previously described in connection with the application of the invention to a variable pitch propeller having a gear driven blade adjusting mechanism, and the pitch setting mechanism B is simultaneously adjusted in set-over and thereby the aligning member C functions through the medium of the driving member 122 and the inner sleeve member 123 to move into contact the slip-ring members 125 and 125' with the fixed brush members 126, thus to complete electrical circuits to include the battery 131 and the motor 109, as best illustrated in the diagram of Fig. 8, whereby the motor rotates in a preestablished direction to adjust the propeller blades, as will be understood. Contemporaneously and in the desired direction, the aligning member C is moved along the threaded driving member 122 to reestablish an alignment with the setting member 58 and blade adjustment is thus carried out in proportion to the amount of set-over established for the setting member 58, whereupon the contact engagement at the combined reversing switch and slip-ring device F is automatically discontinued, the slip-ring members 125 and 125' again resume a position substantially as shown in Fig. 7 and Fig. 8. A reversing of the motor as regards its direction of rotation and consequently a reversing of the propeller blade adjusting action, is accomplished by contact at the combined reversing switch and slip-ring device F being brought to bear oppositely in axial direction as a result of an adjustment at the control station A substantiated by a set-over adjustment of the pitch setting mechanism B in an opposite direction, as will be readily understood.

Constructive changes may be made and various embodiments of my invention adopted without departure from the spirit or scope thereof, and the foregoing disclosure is to be regarded as descriptive and illustrative only and not to be interpreted in a limitative or restrictive sense.

What I claim as my invention is:

1. The combination with a propeller having a shaft and angularly adjustable blades, of mechanism including a power device for adjusting said blades while the propeller is rotating, said mechanism including normally disengaged members surrounding said shaft and relatively rotatable with respect to each other, one of said members being positively driven by said power device, means operable to engage said members whereby said power driven member will drive said other member through said engaging means, means operated by rotation of said members for actuating said adjusting mechanism, and means for automatically disengaging said members when a predetermined degree of angular movement of said blades is reached.

2. A rotary propeller having blades mounted for adjustment to vary the pitch thereof; means including a rotatable member for moving the blades to vary their pitch in one direction or the other according as the rotatable member is driven at a speed in excess of or less than propeller speed; two rotary idler members; means for constantly driving said idler members during rotation of the propeller, one at a speed in excess of propeller speed and the other at a speed less than propeller speed; means including a clutch concentrically disposed with respect to the propeller axis of rotation for operatively connecting one idler member or the other to the rotatable member, to accordingly drive the latter at a speed in excess of or less than propeller speed, and means operable after the pitch of the blades has been varied a predetermined extent for disconnecting said clutch.

3. In a propeller control mechanism, a variable pitch propeller, a blade adjusting mechanism, a source of power, means for connecting said source and mechanism, a control means settable to establish said connecting means to initiate operation of said blade adjusting mechanism, said control means including an axially adjustable member and a rotatable member, and an aligning member connected with said rotatable member and rotatable therewith, said aligning member being threadedly engaged with a part of said blade adjusting mechanism and being movable thereby and relatively to the rotatable member whereby said connecting means is rendered inoperative to connect the source and blade adjusting mechanism after the pitch has been varied an amount determined by the setting of the control means.

4. In an aircraft having a variable pitch propeller, a member mounted on a fixed part of the aircraft and adjustable axially of the propeller, a setting member mounted on the propeller to rotate therewith and axially movable thereon, thrust means between said members whereby the second named member is moved in accordance with the axial adjustment of the first named member, a propeller blade adjusting member, power means for operating the propeller blade adjusting member, an aligning member threaded on the propeller blade adjusting member, a plate and a spring arranged to exert thrust on the aligning member to bring it into alignment with the setting member, said power means and blade adjusting member being arranged to be engaged when said thrust is exerted whereby the blades are adjusted and the aligning member is simultaneously moved by the threaded engagement with the blade adjusting member into alignment with the setting member thereby relieving said thrust and disengaging the power means, control means connected to the first named member to position said setting member and an indicator to indicate the position of the setting member.

5. In an aircraft, a variable pitch propeller provided with a hub and a plurality of blades, a pitch adjusting member annularly mounted on the hub and rotatable to adjust the pitch angle of the blades, power means for rotating said pitch adjusting member, said pitch adjusting member being shiftable axially of the hub to engage said power means, threads on the outer surface of the pitch adjusting member, an annular aligning member engaging said threads and movable axially by means thereof when the pitch adjusting member is driven, a setting member annularly disposed to said aligning member and normally in alignment therewith, means for manually shifting said setting member axially, and resilient means between said setting member and said aligning member for exerting an axial thrust tending to restore alignment between the aligning member and said setting member whenever they are out of alignment, said thrust being transmitted to the blade adjusting member to engage said power means to adjust said blades in a predetermined direction, said threads being operable to move said aligning member in the same direction as the setting member is moved whereby when the blades are adjusted in an amount predetermined by the movement of the setting member the alignment member is brought into alignment with the setting member and the thrust is relieved and the power means disengaged.

6. In a propeller blade control mechanism, an adjusting means, a settable pitch setting mechanism comprising a primary adjustable member and a rotatable secondary member and an antifriction bearing interposed between said members, said adjusting means being connected to said adjustable member to position it according to the desired adjustment, a blade adjusting mechanism, a source of power, means for connecting the source of power to the blade adjusting mechanism to adjust the blades, an aligning member arranged to operate said last-named means when thrust is imposed on it and engaged with the blade adjusting mechanism to be shifted when adjustment is made, a spring and a plate arranged to engage said rotatable secondary member and said aligning member to exert a thrust on said aligning member when the pitch setting mechanism is moved out of alignment therewith thereby engaging said last-named means and causing adjustment of the blades, and to relieve said thrust when the operation of the blade adjusting mechanism moves said aligning member back into alignment with the pitch setting mechanism.

7. In an aircraft, an adjustable pitch propeller comprising a blade adjusting mechanism, a power means for operating the blade adjusting mechanism, a manually settable setting member in the form of a ring rotatable with the propeller, an aligning member in the form of a ring operable to engage said power means with the blade adjusting mechanism when subjected to axial thrust, the setting member and the aligning member being concentrically arranged and of equal width and relatively non-rotatable, means for exerting a thrust upon said aligning member upon movement of the setting member comprising a pair of plates engaging corresponding opposed faces of the setting and aligning members, and springs tensioned between said plates, and means connecting the aligning member with the blade adjusting member to move the aligning member axially in the direction of thrust when blade adjustment occurs.

8. In an aircraft, an adjustable pitch propeller comprising a blade adjusting mechanism, power means for operating the blade adjusting mechanism, a manually settable member rotatable with the propeller, an aligning member operable to cause engaging of the power means and blade adjusting mechanism when subjected to axial thrust, means interposed between the settable member and the aligning member for resiliently creating a thrust on the aligning member when the manually settable member is moved to a new position and to relieve said thrust when the aligning member is moved to a corresponding position, means associated with the blade adjusting mechanism for moving the aligning member in proportion to blade adjustment when the adjusting mechanism is operated, thereby relieving said thrust when the aligning member is moved to said corresponding position and disengaging the power means and blade adjusting mechanism to prevent further adjustment.

ELLSWORTH W. AUSTIN.